United States Patent [19]
Aras et al.

[11] Patent Number: 5,884,037
[45] Date of Patent: Mar. 16, 1999

[54] SYSTEM FOR ALLOCATION OF NETWORK RESOURCES USING AN AUTOREGRESSIVE INTEGRATED MOVING AVERAGE METHOD

[75] Inventors: Caglan Mehmet Aras; Jeffrey D. Miller, both of Raleigh; Roderick Keith Scott, Durham, all of N.C.

[73] Assignee: International Business Machines Corporation, Armonk, N.Y.

[21] Appl. No.: 734,661

[22] Filed: Oct. 21, 1996

[51] Int. Cl.[6] ................................................. G06F 17/00
[52] U.S. Cl. ........................................................ 395/200.56
[58] Field of Search ........................ 395/200.33, 200.56, 395/200.54, 200.53, 200.47; 370/468, 230, 232, 396; 706/16

[56] References Cited

U.S. PATENT DOCUMENTS

| | | |
|---|---|---|
| 4,764,920 | 8/1988 | Furuya . |
| 4,979,165 | 12/1990 | Dighe et al. . |
| 5,042,027 | 8/1991 | Takase et al. . |
| 5,179,556 | 1/1993 | Turner . |
| 5,226,041 | 7/1993 | Waclawsky et al. . |
| 5,231,631 | 7/1993 | Buhrke et al. ............................ 370/230 |
| 5,274,625 | 12/1993 | Derby et al. . |
| 5,276,677 | 1/1994 | Ramamurthy et al. . |
| 5,289,462 | 2/1994 | Ahmadi et al. . |
| 5,291,481 | 3/1994 | Doshi et al. . |
| 5,311,513 | 5/1994 | Ahmadi et al. . |
| 5,347,511 | 9/1994 | Gun . |
| 5,359,593 | 10/1994 | Derby et al. . |
| 5,365,523 | 11/1994 | Derby et al. . |
| 5,367,523 | 11/1994 | Chang et al. . |
| 5,402,520 | 3/1995 | Schnitta ...................................... 706/16 |
| 5,479,404 | 12/1995 | Francois et al. ......................... 370/468 |
| 5,583,792 | 12/1996 | Li et al. .............................. 395/200.54 |
| 5,604,742 | 2/1997 | Colmant et al. ......................... 370/396 |
| 5,673,393 | 9/1997 | Marshall et al. .................... 395/200.56 |
| 5,754,530 | 5/1998 | Awdeh et al. ............................ 370/232 |

OTHER PUBLICATIONS

"Real–Time Bandwidth Adaptation Algorithm," *IBM Technical Disclosure Bulletin,* vol. 36, No. 1, Jan. 1993, pp. 178–179.

"Ethernet Bandwidth Management," *IBM Technical Disclosure Bulletin,* vol. 37, No. 3, Mar. 1994, pp. 591–594.

*Primary Examiner*—Ellis B. Ramirez
*Attorney, Agent, or Firm*—John D. Flynn; Winstead, Sechrest & Minick, PC

[57] ABSTRACT

A reservation based bandwidth management system for a data processing system network allocates network resources to client computer systems requesting access to other computer systems within the network based on a bandwidth predicting algorithm. The bandwidth predicting algorithm utilizes an autoregressive integrated moving average trend analysis to forecast future values of bandwidth capacity at a link or system level used by elements that do not conform to a reservation policy. The bandwidth predictor may utilize a utility that analyzes the bandwidth utilization trend over a previous period of time and generates appropriate seasonal coefficients to be used by the predictor algorithm.

19 Claims, 17 Drawing Sheets

PRIOR
ART**

FIG. 20

INCLUDE

| 1 | 1 | 0 | 0 | 0 |
|---|---|---|---|---|

| 1 | 0 | 1 | 0 | 0 |
|---|---|---|---|---|

X       X

PARAMETER

| $\phi_1$ | $\phi_2$ | $\phi_3$ | $\phi_4$ | $\phi_5$ |
|---|---|---|---|---|

| $\theta_1$ | $\theta_2$ | $\theta_3$ | $\theta_4$ | $\theta_5$ |
|---|---|---|---|---|

FIG. 21

MODIFY

| 1 | 0.5 | 1 | 1 | 1 |
|---|---|---|---|---|

| 1 | 1 | 1 | 1 | 1 |
|---|---|---|---|---|

X       X

PARAMETER

| $\phi_1$ | $\phi_2$ | $\phi_3$ | $\phi_4$ | $\phi_5$ |
|---|---|---|---|---|

| $\theta_1$ | $\theta_2$ | $\theta_3$ | $\theta_4$ | $\theta_5$ |
|---|---|---|---|---|

FIG. 22

COMBINED

| 1 | 0.5 | 0 | 0 | 0 |
|---|---|---|---|---|

| 1 | 0 | 1 | 0 | 0 |
|---|---|---|---|---|

X       X

PARAMETER

| $\phi_1$ | $\phi_2$ | $\phi_3$ | $\phi_4$ | $\phi_5$ |
|---|---|---|---|---|

| $\theta_1$ | $\theta_2$ | $\theta_3$ | $\theta_4$ | $\theta_5$ |
|---|---|---|---|---|

SYSTEM FOR ALLOCATION OF NETWORK RESOURCES USING AN AUTOREGRESSIVE INTEGRATED MOVING AVERAGE METHOD

TECHNICAL FIELD

The present invention relates in general to data processing networks, and in particular, to a system and method for allocating network resources.

BACKGROUND INFORMATION

Data processing, or computer, networks are quickly integrating themselves into our every day personal and business environments just as the telephone network over for the previous portion of this century. Local area networks ("LANs") and wide area networks ("WANs") connect our computers in our homes and offices, allow us to access money from automatic teller machines, provide for point-of-sale transactions, and enable the transmission of information almost instantaneously between any two points on the planet, among other utilities too numerous to list herein.

Generally, such networks are interconnected by private and "public" telecommunications facilities, including via domestic and international telephone companies through telephone and/or data carrying facilities. Correspondingly, such telecommunications facilities providing communications links between computer systems will have bandwidth limitations on their ability to transmit information.

With the advent of high speed communications links providing multiple services on a single link, the need to manage the access to the communications links becomes more important. Recent products demonstrate a trend in enhanced bandwidth management by providing a reservation mechanism or policy that provides a deterministic means of managing the bandwidth resources. One example of a reservation system is the existing telephone network. As a telephone number is dialed, the resource reservation system in the network determines the availability of links between the caller and the callee. Since a telephone network only supports a single traffic type (voice), and all users of the networks are by definition abiding by their resource request (the bandwidth required by voice transmissions does not change during the course of a call), this type of resource management is comparatively simple.

New networks such as Asynchronous Transfer Mode ("ATM") networks, permit the co-existence of different data types such as video, computer data, and voice. Here, resource requirements, variability of resource utilization and the need for guaranteed capacity change by application. For example, video bandwidth is bound and must be guaranteed for the duration of a video call. Computer data transfers are not bound, vary over time frames as small as a second, but do not require guaranteed bandwidth. Voice is similar to video, in bandwidth bounds and reservation requirements. In these networks, the reservation system must manage the complexity of guaranteeing resources for voice and video applications, while ensuring that non-reserved applications do not consume resources allocated for reserved applications.

There are two basic problems that may be present with typical reservation solutions. First, not all users on the network may participate in the reservation scheme. This is especially troublesome in shared media implementations (e.g., LANs) or in networks with heterogeneous equipment and services. Less than 100% participation limits the effectiveness of the reservation system since some portion of the network is being utilized by unreserved or non-conforming users. Second, this non-conforming portion of the network fluctuates over time and thus makes it difficult to determine the amount of bandwidth available to the reservation system.

Traffic on any given shared media network can be broken into two general categories with respect to bandwidth management systems. The first category is that network traffic that uses the reservation aspect of the bandwidth management system to gain access to the network. This traffic is said to conform to the reservation system. The second category is the traffic that does not use the reservation system but still requires a portion of the network bandwidth. This class of information is referred to as non-conforming traffic. Many networks support a reservation mechanism, but lack a policing mechanism. This is because implementing a universal policing mechanism in a shared media environment is very difficult unless the mechanism is an inherent part of the transmission scheme. Most LANs implemented today lack such a policing capability.

As an example, assume a client computer system wishes to use a network application requiring a virtual channel of 2 Mb/s, guaranteed, on a network which uses a traditional reservation policy. Not all components comply with the reservation scheme, and the network assumes that the non-conforming traffic has a maximum bandwidth of 2 Mb/s. The network has a total bandwidth of 10 Mb/s and 5 Mb/s are currently being used for conforming applications. FIG. 5 illustrates how such a traditional reservation system 500 with a connection control function 503 may operate.

The client computer system 501 first contacts the connection agent 505 through the telecommunications network 504 via path 510 to request connection through the network 504 to the application server 502 (typically, a remote computer system). The client 501 specifies that its application needs 2 Mb/s of the bandwidth of the network 504.

The connection agent 505 queries the reservation manager 506 via path 511 to see if there are 2 Mb/s of bandwidth available in the network 504. The reservation manager 506 is aware that 5 Mb/s are currently being used by conforming applications, and assuming that the non-conforming traffic requires less than 2 Mb/s of bandwidth, the reservation manager 506 informs the connection agent 505 that there is adequate bandwidth in reserve to handle the request from the client 501. The total conforming bandwidth is now set to 7 Mb/s. The connection agent 505 connects the client 501 to the application server 502 via the network 504 and paths 512 and 513. The client 501 attempts to use the application and its requisite 2 Mb/s.

Now, suppose that the non-conforming traffic on the network 504 increases to 4 Mb/s instead from 2 Mb/s as the reservation manager 506 assumed. In this case, the existing traffic plus the new request will saturate the network 504 by attempting to use 11 Mb/s. The graph illustrated in FIG. 6 further illustrates this problem caused by the network bandwidth allocation mechanism utilized within system 500. As can be noted from the graph, under the exemplary scenario discussed above with respect to FIG. 5, connection of the client 501 to the application server 502 by the connection control 503 will result in an allocation of network bandwidth beyond the capacity of the network.

Therefore, there is a need in the art for a more efficient and improved bandwidth management system for allocating bandwidth within a data processing system network.

SUMMARY OF THE INVENTION

To improve bandwidth management, the present invention uses seasonal Autoregressive Integrated Moving Average ("ARIMA") trend analysis to enhance reservation-based management systems. Seasonal ARIMA models provide a flexible means of forecasting future values of a variable based solely on the periodicity of the past occurrences. The periodic version of the ARIMA model is used because established networks generally have utilization curves that demonstrate strong seasonal tendencies. The present invention includes the following components: a static model generation utility ("SMGU") and a non-conforming bandwidth predictor ("NCBP").

The SMGU is an off-line utility that analyzes the bandwidth utilization trend over the previous period of time and generates the appropriate seasonal ARIMA coefficients to be used by the bandwidth predictor.

The NCBP uses a seasonal ARIMA model with coefficients generated by the SMGU to predict the amount of bandwidth at a link or system level used by elements that do not conform to the reservation policy. This would be used by the reservation mechanism to predict the amount of available bandwidth.

The predicted available bandwidth for a period of time is then utilized by the connection control process for allocating network resources to requesting computer systems.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIGS. 20–22 illustrate example operations performed within the model shaping subcomponent.

DETAILED DESCRIPTION

Figure 1:
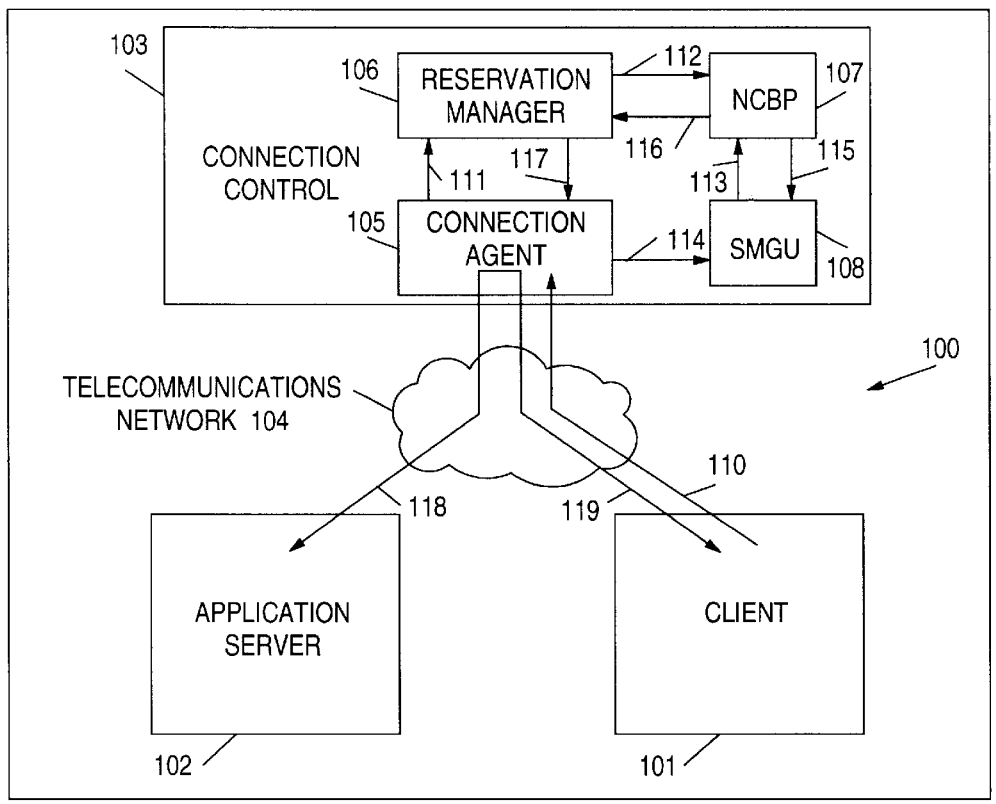
FIG. 1 illustrates, in block diagram form, an implementation of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The seasonal ARIMA model is a general class of models used to forecast a time series entirely from its own history. ARIMA models are used for predicting future behavior in many different and diverse fields such as forecasting hourly water usage, predicting U.S. money demand, anticipating atomic clock errors, etc. The model uses autoregressive terms and moving average terms to factor in the seasonality of the data trend and differences from time period to time period when making a prediction. The model has three components, two of which are used to adjust the prediction from the first, which is a simple mean. The second component is a linear combination of autoregressive terms. The last component is a linear combination of moving average terms. A moving average term is defined as the difference between a data point and its prediction. The ARIMA model is defined as $$\hat{y}_t = \mu + \phi_1 y_{t-1} + \phi_2 y_{t-2} + \ldots + \phi_m y_{t-m} - \theta_1 e_{t-1} - \theta_2 e_{t-2} - \ldots - \theta_n e_{t-n}$$

where $\hat{y}_t$ is the predicted value of y, the bandwidth being used by non-conforming applications, at time t;

$\mu$ is the mean of the bandwidth up to time t;

$y_{t-k}$ is the autocorrelation of the data at k time unit lags;

$\phi_k$ and $\theta_k$ are coefficients estimated from the data chosen to minimize the prediction error; and $e_{t-k}$ is the prediction error at k time unit lags or $\hat{y}_{t-k} - y_{t-k}$.

In order to use an ARIMA model, the number of autoregressive and moving average terms used to modify the mean is determined. Insight can be gained from a knowledge of the nature of the data being predicted, or lacking that, from empirical knowledge gained by observing the history of bandwidth utilization and error predictions. For example, when trying to predict bandwidth requirements in a network, if it is known that the network becomes highly loaded on an hourly basis, the model may contain autoregressive terms corresponding to a lag of one hour.

If no particular trends are known, choosing the number of terms can be performed by trial and error. A small number of terms, for example two of each, could be tried for a number of predictions. The degree of success for the predictions can be determined in a number of ways, one being calculating the Mean Square Error ("MSE") of the predictions over time. For n predictions, $$MSE = \sum_{t=1}^{n} (\hat{y}_i - y_i)^2$$

which is the sum of the differences between the actual bandwidth usage and the prediction, squared at points in time. Autoregressive terms and moving average terms can be added or deleted from the model and the MSE calculated. The number of each that gives the smallest MSE can be used. The analysis could be performed one time, and the results used permanently, or the analysis could be repeated periodically with the optimal number of terms being adjusted accordingly. This analysis could either be performed as part of the ARIMA model itself or performed by an off-line, independent process with the results passed to the ARIMA model as needed.

The other challenge of ARIMA modeling is determining the coefficients of the autoregressive and moving average terms. The coefficients for the autoregressive terms, the $\phi_k$'s from the equation above, are estimated from the slope of the regression line through the points $(y_{t-k}, y_t)$. Similarly, the $\theta_k$'s, the coefficients for the moving average terms, are estimated from the slope of the regression line through the points $(e_k, y_k)$.

Referring to FIG. 1, there is illustrated a bandwidth management system 100 using ARIMA prediction on a single link established between a client computer system 101 and an application server 102. Two components of the system 100 are a static model generation utility ("SMGU") 108 and a non-conforming bandwidth predictor ("NCBP") 107.

The SMGU 108 (which may be an off-line function) provides the ARIMA coefficients to the ARIMA predictor in NCBP 107. It is a mathematical engine that computes the $\phi_k$'s and $\theta_k$'s of the ARIMA equation. It may operate independently of the network components so that it does not adversely affect the network performance. These coefficients are passed to the NCBP 107 to be applied to the ARIMA predictor.

Figure 2:
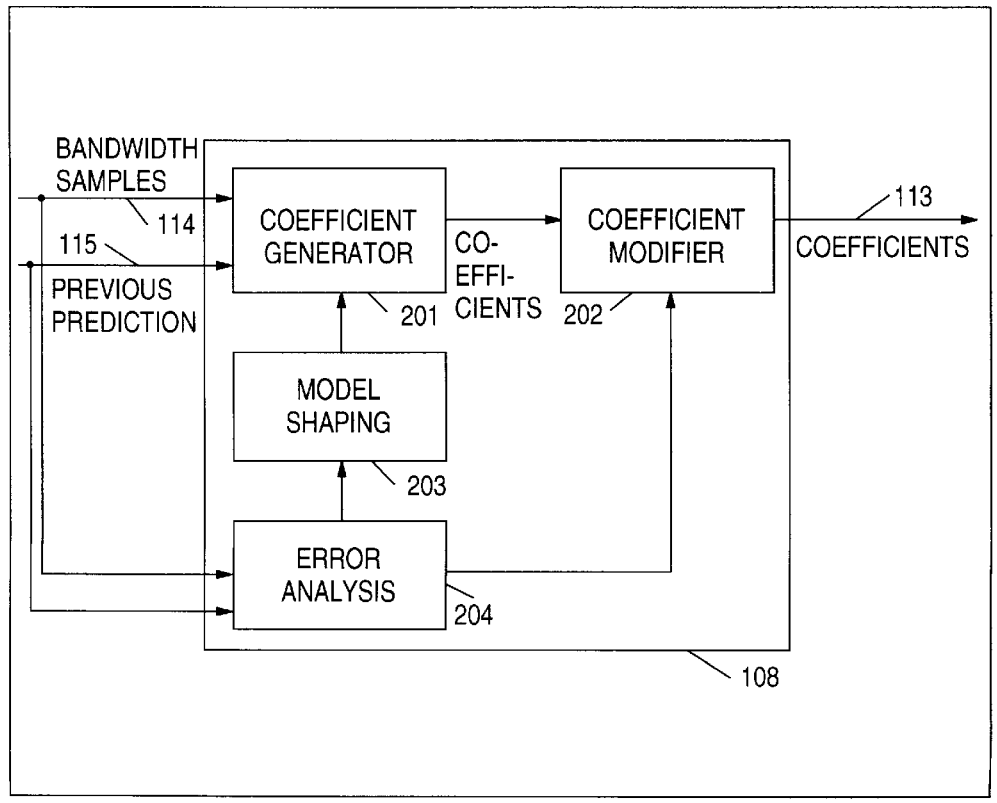
FIG. 2 illustrates, in block diagram form, further detail of a static model generation utility.

Referring next to FIG. 2, there is shown more detail of the SMGU 108. The coefficient generator 201 uses two inputs to compute the required coefficients. The first is the actual bandwidth utilization at any given time (labeled as "Bandwidth Samples"). The second is a history of past predictions made by the ARIMA predictor (labeled as "Previous Predictions").

The error analysis subcomponent 204 compares the past predictions of the ARIMA predictor with the actual bandwidth at that point in time. By analyzing the types and magnitudes of the prediction errors, the optimal number of autoregressive and moving average terms can be determined. For example, it could be found that using more than two autoregressive terms and three moving average terms do not significantly improve the accuracy of the predictions. This information would be communicated to the model shaping subcomponent 203, which would set the number of coefficients for the coefficient generator 201 to compute. The error analysis subcomponent 204 could also look for trends in the errors. For example, if the predictions tend to overreact to changes in the bandwidth and cause wild oscillations in the predictions, the coefficient modifier subcomponent 202 can dampen the coefficients by multiply them by appropriate fractions. The proper fraction could be determined by analyzing the magnitude of the errors made by the predictor. For example, if the predictor continually over compensates for fluctuations in bandwidth demand by 50%, the coefficients suggested by the SMGU 108 would be multiplied by one-half. Lacking such definitive insight, a process of trial and error could be engaged in which various fractions could be tried, and the set giving the smallest MSE would be chosen. The error analysis subcomponent 204 would continually monitor the prediction errors and adjust the fractions as required to minimize the errors.

Subcomponents 202–204 are optional in the present invention.

Figure 8:
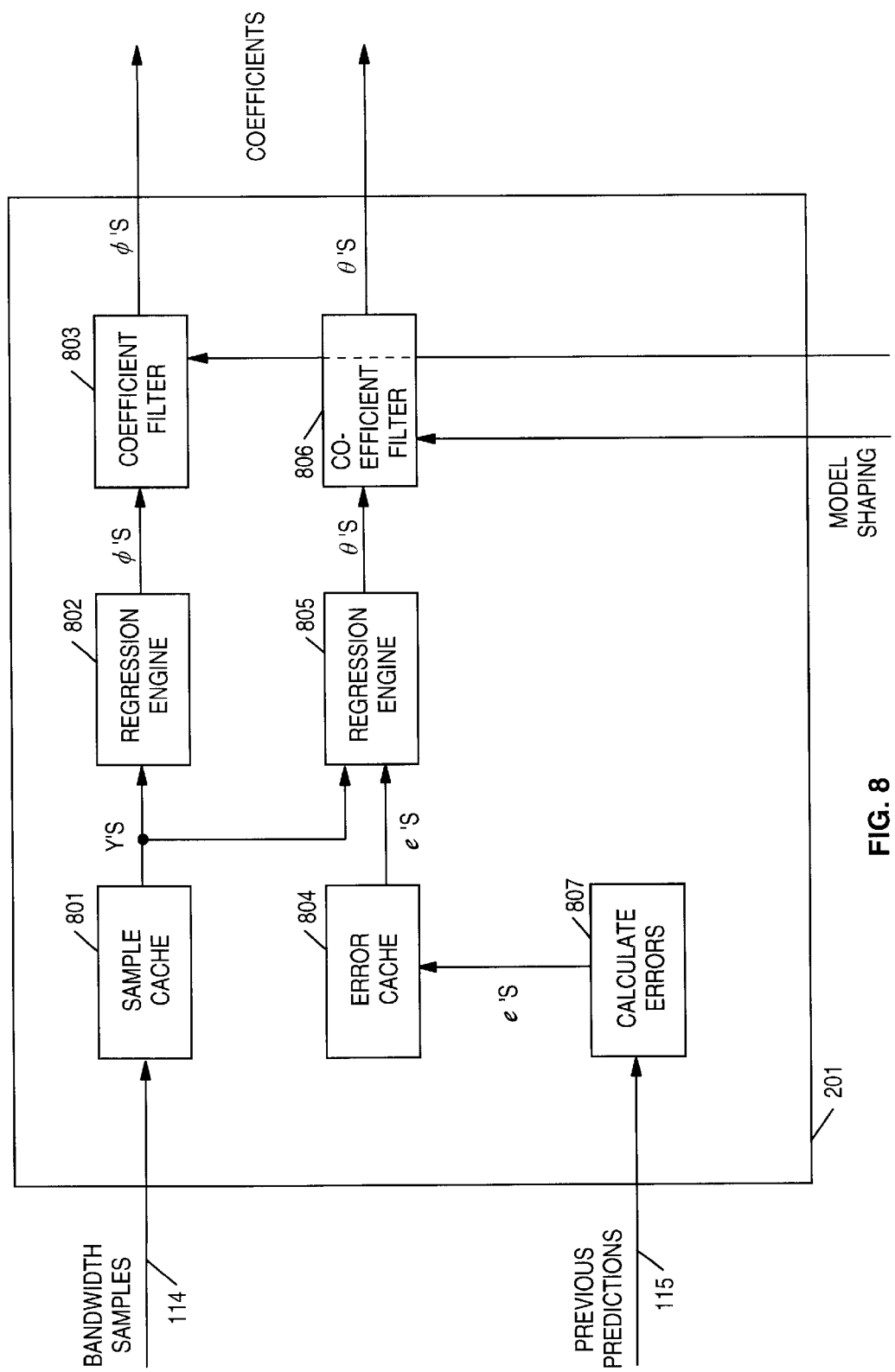
FIG. 8 illustrates, in block diagram form, further detail of the coefficient generator illustrated in FIG. 2.
Figure 9:
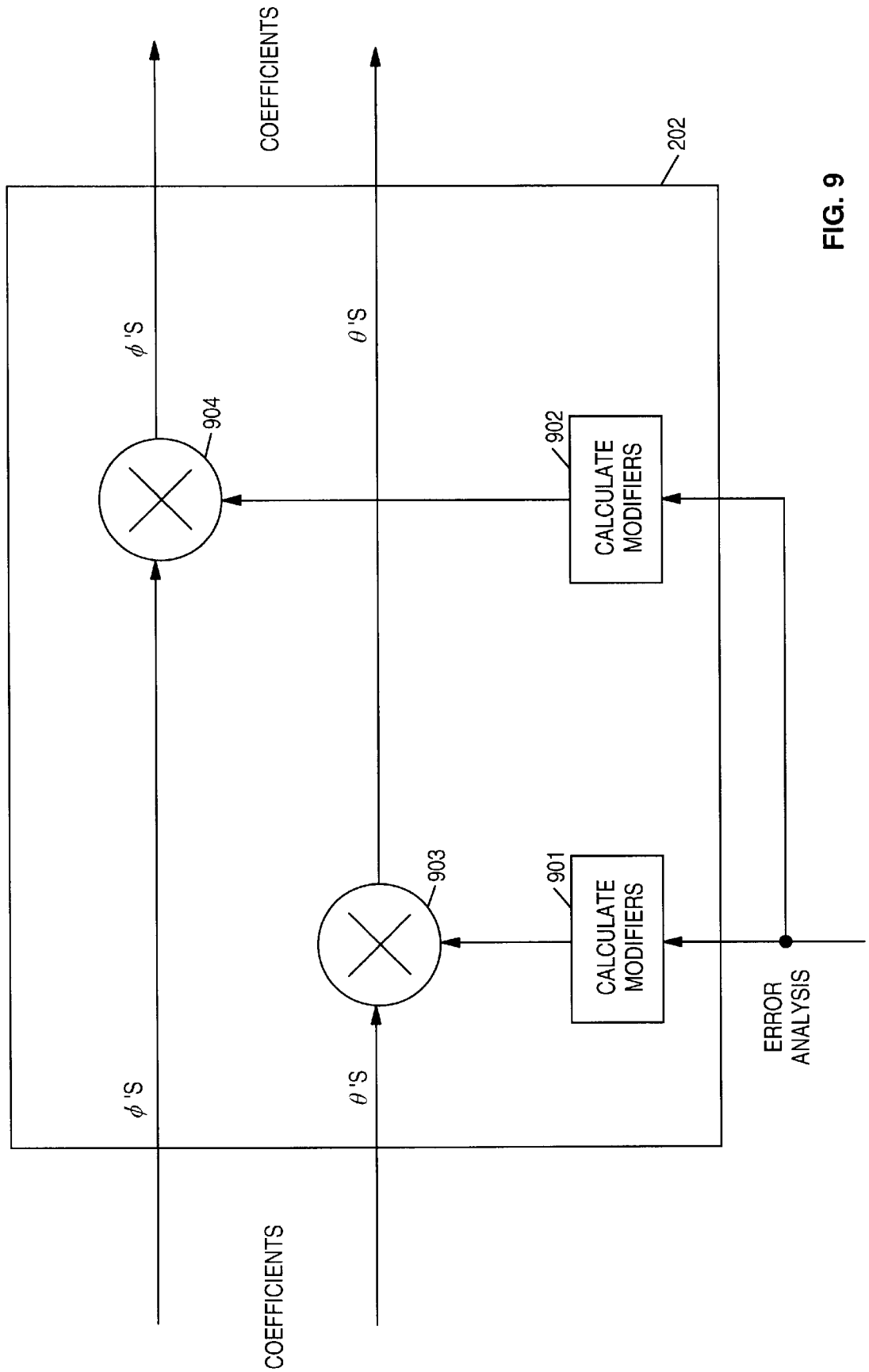
FIG. 9 illustrates, in block diagram form, further detail of the coefficient modifier illustrated in FIG. 2.

Referring next to FIG. 8, there is illustrated further detail of the coefficient generator 201. Bandwidth samples on path 114 are received by the sample cache 801 and stored therein. A linear regression is performed on the bandwidth samples by the regression engine 802.

Errors in previous predictions are calculated in block 807 and stored in the error cache 804. These errors and bandwidth samples are supplied to the regression engine 805. The slope of the regression line through the points pertaining to the bandwidth samples are passed to the coefficient filter 803 which determines which of these slopes are passed to the ARIMA calculator within the NCBP 107. The slope of the regression line through points corresponding to the bandwidth samples and the previous predictions are supplied to the coefficient filter 806 which determines which of these are used within the ARIMA model in the NCBP 107. The coefficient filters 803 and 806 utilize signals from the model shaping subcomponent 203 for determining which coefficients to pass to the ARIMA model in the NCBP 107. An example operation of the coefficient filter 803 is shown by the left portion of FIG. 20, while the right portion of FIG. 20 shows an example operation of coefficient filter 806. The model shaping subcomponent 203 is further described below.

Figure 10:
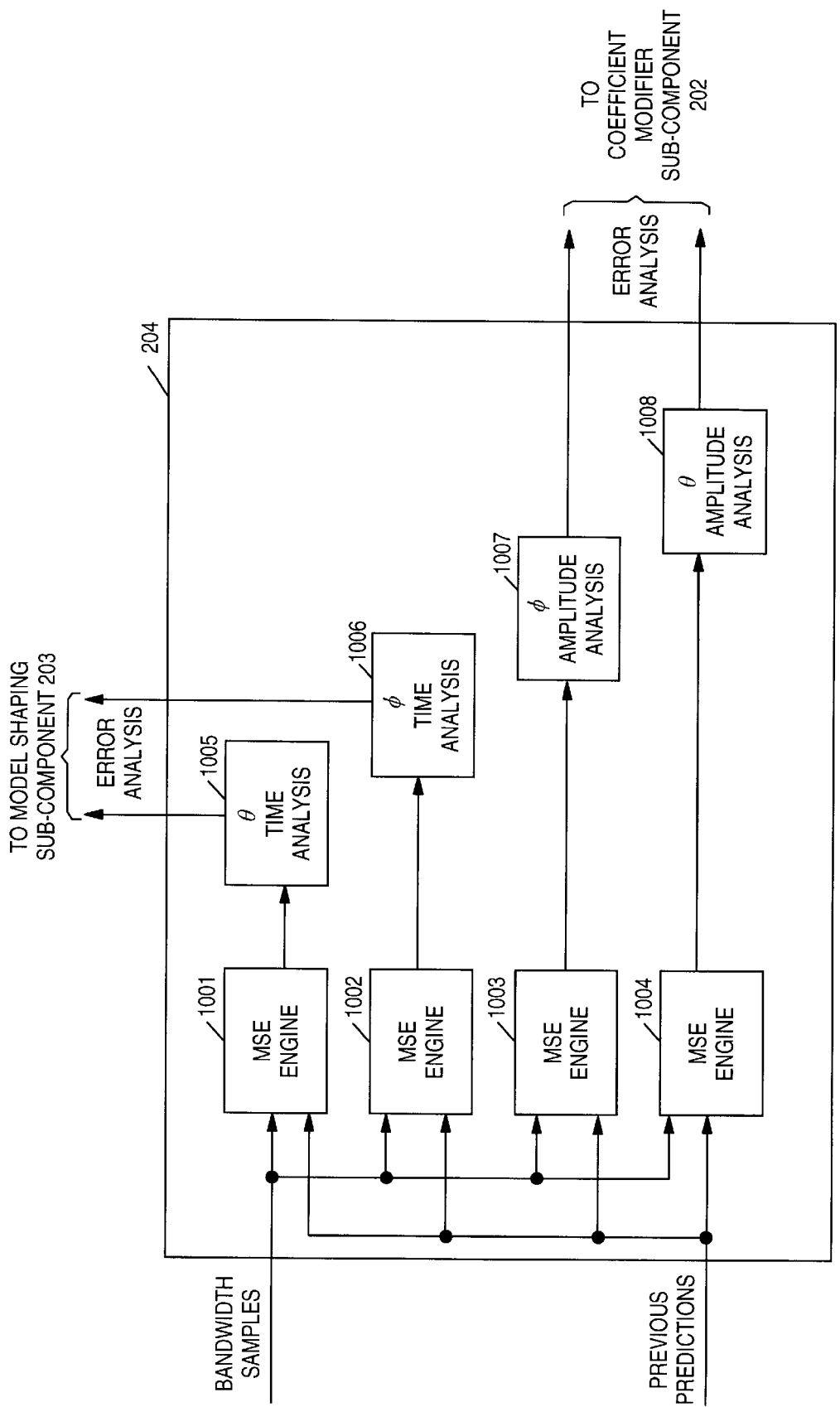
FIG. 10 illustrates, in block diagram, further detail of the error analysis subcomponent illustrated in FIG. 2.

Referring next to FIG. 10, there is illustrated a more detailed block diagram of the error analysis subcomponent 204. Bandwidth samples and previous predictions are passed to the mean square error ("MSE") engines (calculators) 1001–1004. Various combinations of coefficients with respect to the time lags are assumed and the MSE is calculated.

The error analysis subcomponent 204 is an optional, potentially off-line, process that can lead to more accurate predictions from the ARIMA model. As discussed above, the ARIMA model as defined makes a prediction based on the sum of three components:

The mean of the samples received, $\mu$;

The sum of a collection of previous samples y, each multiplied by a constant $\phi_i$;

The sum of a collection of prediction errors $e_i$ each multiplied by a constant $\theta_i$. Here, i corresponds to a point in time, relative to $_0$, the time the prediction is made.

Block 1005 represents a procedure that would feed various collections of $e_i \theta_i$ to an ARIMA model and then calculate the MSE for a series of predictions. For example, one could try i=1, 2, 3 or i=1, 3, 5, etc. A combination yielding the lowest MSE would be use for subsequent forecasts. This information would be communicated to the model shaping subcomponent 203.

Block 1006 is similar, except it would consider various combinations of $y_i, \phi_i$. Of the combinations that are tried, the one yielding the smallest MSE may be used for subsequent predictions.

The procedures in blocks 1005 and 1006 consider the influence of the model components in the time domain. They attempt to establish which parameters have the most impact on the accuracy of the predictions. Parameters with little correlation to the model accuracy can be excluded.

Another optional procedure that could be performed is studying the effect of modifying the $\phi$'s and $\theta$'s. Assume it is determined by the time analysis procedures in blocks 1005 and 1006 that the minimum MSE is achieved with an ARIMA model consisting of the previous two bandwidth samples and the previous two odd error samples, $$\hat{y}_t = \mu + \phi_1 y_{t-1} + \phi_2 y_{t-2} - \theta_1 e_{t-1} - \theta_3 e_{t-3} \quad \text{(Equation 1)}$$

Suppose that further analysis of the prediction errors showed that the MSE could be further reduced if the second sample parameter were consistently reduced by half, then the ARIMA model becomes:

$$\hat{y}_t = \mu + \phi_1 y_{t-1} + 0.5\phi_2 y_{t-2} - \theta_1 e_{t-1} - \theta_3 e_{t-3} \quad \text{(Equation 2)}$$

Equation 1 is the basic ARIMA model. The further analysis noted above performed in blocks 1007 and 1008 determines if the coefficients in co-efficient modifier subcomponent 202 could be modified to produce a lower MSE. If modification is recommended, the values are passed to co-efficient modifier subcomponent 202. This is reflected in the example represented by Equation 2, where the second theta parameter is reduced by one-half.

Figure 11:
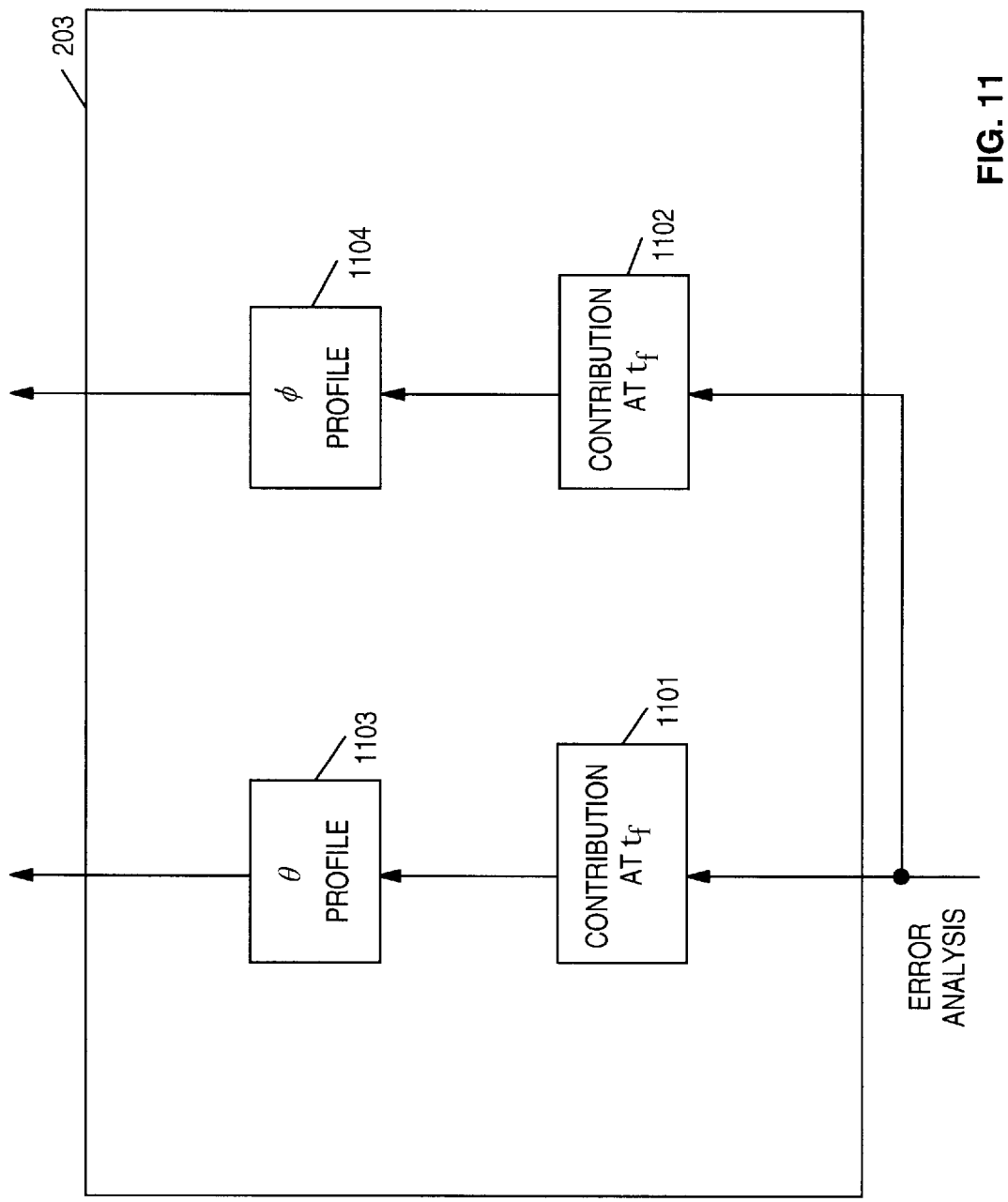
FIG. 11 illustrates, in block diagram form, further detail of the model shaping subcomponent illustrated in FIG. 2.

Referring next to FIG. 11, there is illustrated optional model tuning as described above with respect to FIG. 10. One way of implementing the results of that error analysis for which parameters to include would be to construct an array of 1's and 0's and then multiply it times an array of the ARIMA parameters. For the example described above with respect to Equation 1, assuming a maximum of five parameters are to be implemented, such a multiplication of arrays can be performed in block 1104 as illustrated in FIG. 20.

In a similar fashion, the model parameters could be modified by a constant in order to achieve more accurate predictions. Again, this could be implemented as an array of numbers representing the modifying constants multiplied times the ARIMA parameters. For the example illustrated above with respect to Equation 2, please refer to FIG. 21 for such an implementation of a multiplication of arrays in block 1103.

In a system implementing both model shaping and parameter modification, the actions could be combined into one array to handle both, as illustrated in FIG. 22. These parameters are stored in blocks 1101 and 1102 with any modification stored in blocks 1103 and 1104. If model shaping subcomponent 203 is implemented in hardware, these values would be stored in hardware registers. If model shaping subcomponent 203 is implemented in an off-line processor such as a personal computer, the values would be stored in a program's data structure.

Figure 3:
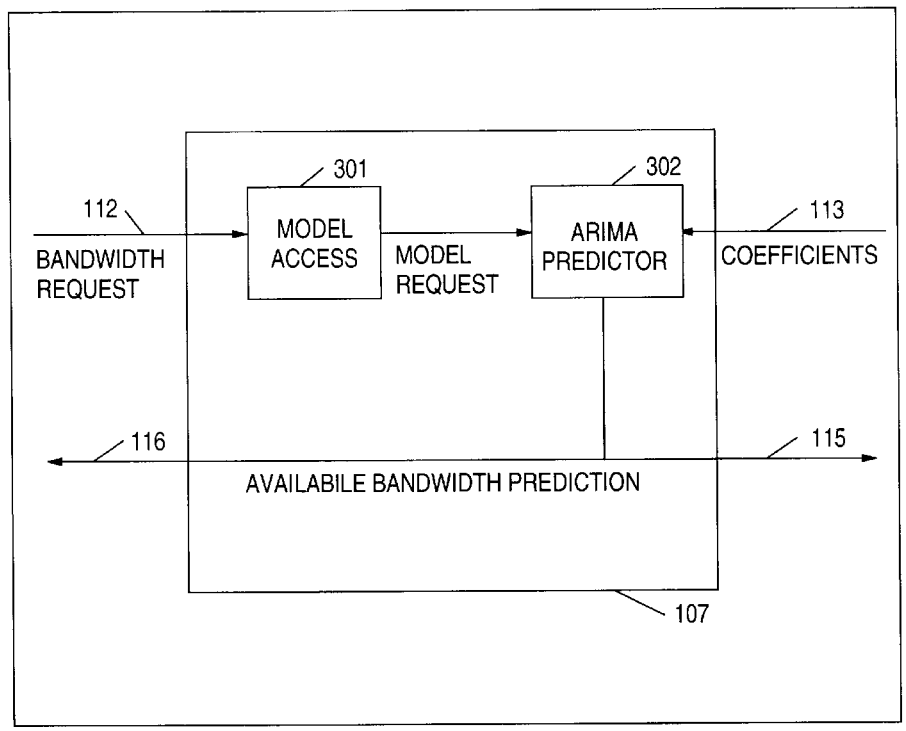
FIG. 3 illustrates, in block diagram form, further detail of a non-conforming bandwidth predictor.

Referring next to FIG. 3, there is illustrated more detail of the NCBP 107. The NCBP 107 uses coefficients from the SMGU 108 to predict available bandwidth at the request of the reservation manager 106. Like the SMGU 108, the NCBP 107 is an off-line function, and its execution does not affect the network performance. The NCBP 107 has two subcomponents. The model access subcomponent 301 receives the request for a prediction and initiates the ARIMA predictor subcomponent 302. Using coefficients from the SMGU 108, the prediction is made and passed back to the model access subcomponent 301 for error analysis. The prediction is also given to the SMGU 108.

Figure 12:
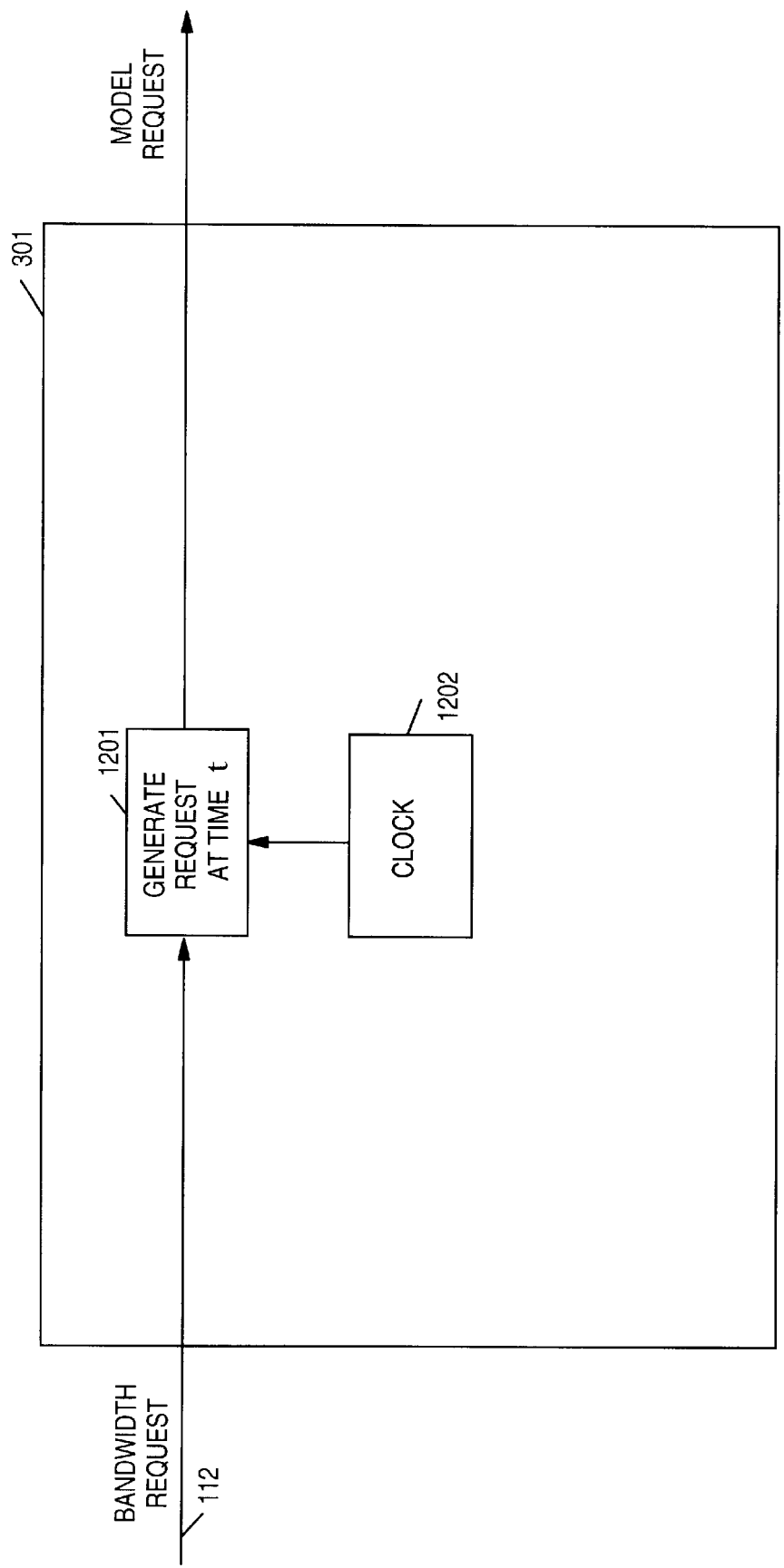
FIG. 12 illustrates, in block diagram form, further detail of the model access subcomponent illustrated in FIG. 3.

Referring next to FIG. 12, there is illustrated a more detailed block diagram of the model access subcomponent 301. The model access subcomponent 301 receives a bandwidth request into block 1201, which generates a model request at time t synchronized with the sample generator, which is circuitry that measures or samples the bandwidth at time t. The sample generator takes an instantaneous sample of the actual bandwidth being used at given points in time. The clock 1202 notifies block 1201 when a sample is needed. Blocks 1201 and 1202 work together to insure that samples are taken when required. At the synchronization point, a model calculation request is generated.

Figure 13:
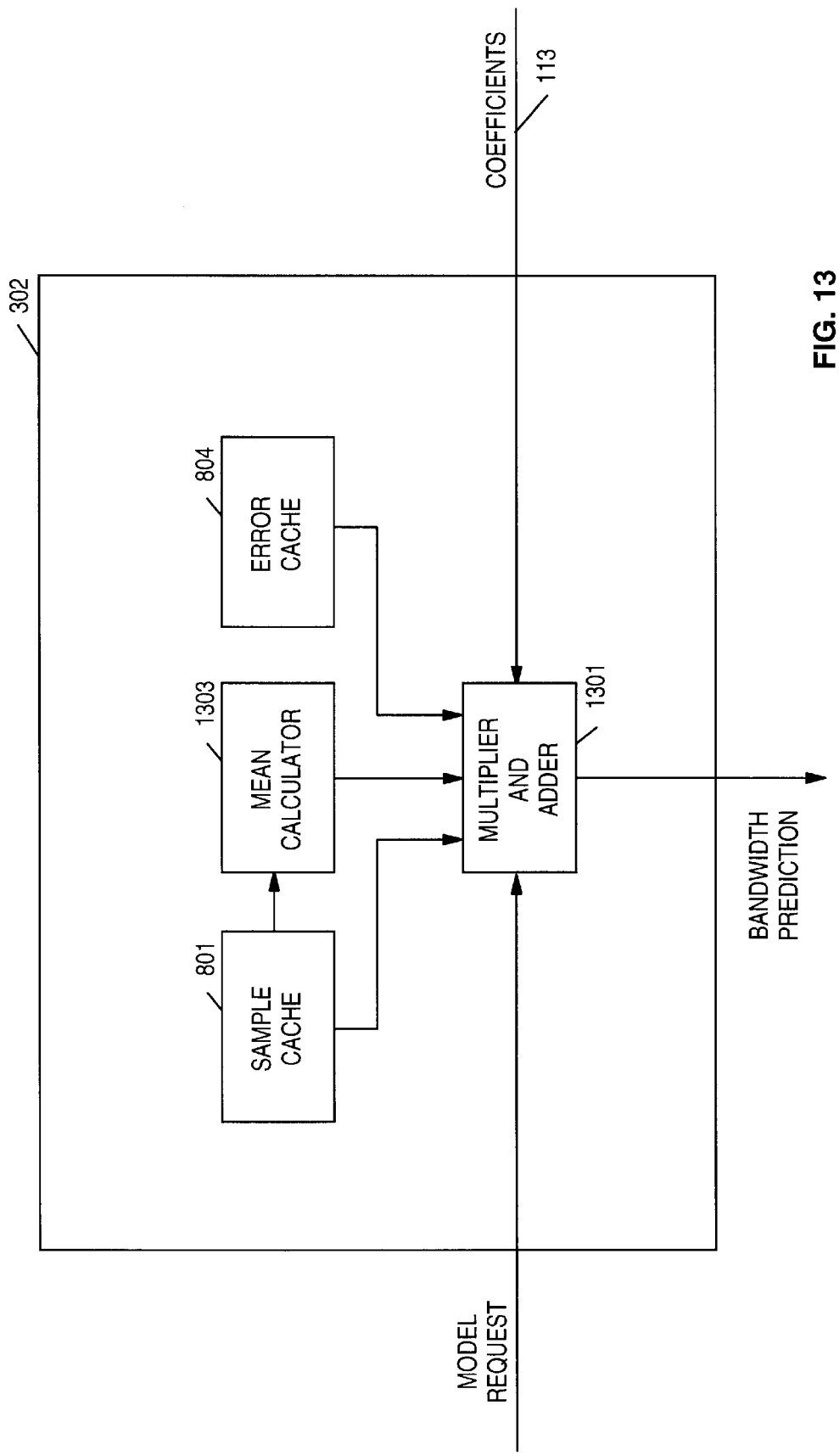
FIG. 13 illustrates, in block diagram form, further detail of the ARIMA predictor illustrated in FIG. 3.

Referring next to FIG. 13, there is illustrated more detail of the ARIMA predictor 302. The sample cache 801 and the error cache 804 operate in the same manner as described above with respect to FIG. 8. The mean calculator 1303 averages the bandwidth samples over a time period. A system built to implement the present invention would have some sort of configuration utility or function. Some of the parameters would specify the frequency that samples are to be taken and how many past samples to retain for calculations. The maximum number of samples saved would be determined by the amount of storage available in which to save them. For example, if samples are to be taken every second and history over the last 24 hours is to be saved, 1440 storage locations would be needed. Once storage is full, the oldest sample (t-1440) is discarded to make room for the present sample ($t_0$). The average referred to above is the average over the 1440 samples in storage at that time.

A model calculation request is received by logic circuitry 1301 requesting an ARIMA calculation. Coefficients are collected on path 113 and are multiplied by the corresponding bandwidth samples and error samples from the sample cache 801 and the error cache 804, respectively. The products are then summed with the current sample mean calculated by the mean calculator 1303. This is all performed within logic circuitry 1301 in accordance with the formula described above for producing $\hat{y}_t$, which is the bandwidth prediction of the available bandwidth supplied by the NCBP 107 on paths 115 and 116.

Returning to FIG. 1, a description will be provided of an example process for providing a connection control function using an ARIMA model in accordance with the present invention. Initially, the client computer system 101 requests from the connection control system 103 via path 110 a specific amount of bandwidth from the connection agent 105. Thereafter, the connection agent 105 relays the request to the reservation manager 106 via path 111. The reservation manager 106 requests the NCBP 107 via path 112 for a prediction of the available bandwidth within the telecommunications network 104. Using ARIMA coefficients from the SMGU 108, the NCBP 107 makes a prediction. The ARIMA coefficients from the SMGU 108 are provided to the NCBP 107 via path 113.

The SMGU 108 has been monitoring the actual bandwidth utilization in the telecommunications network 104 from samples received from the connection agent 105 via path 114. Previous predictions from the NCBP 107 are also used by the SMGU 108 as received via path 115 to modify the coefficients and model as required.

The NCBP 107 informs the reservation manager 106 via path 116 how much bandwidth should be available by making a prediction using the ARIMA model. The reservation manager 106 makes the decision whether or not to allow the requested connection between the client system 101 and the application server 102 based on the NCBP prediction and informs the connection agent 105 via path 117 accordingly.

The connection agent 105 acts on the input via path 117 from the reservation manager 106 and either allows or denies the connection. If the connection is allowed, data begins to flow between the application server 102 and the client 101 via paths 118 and 119.

Figure 14:
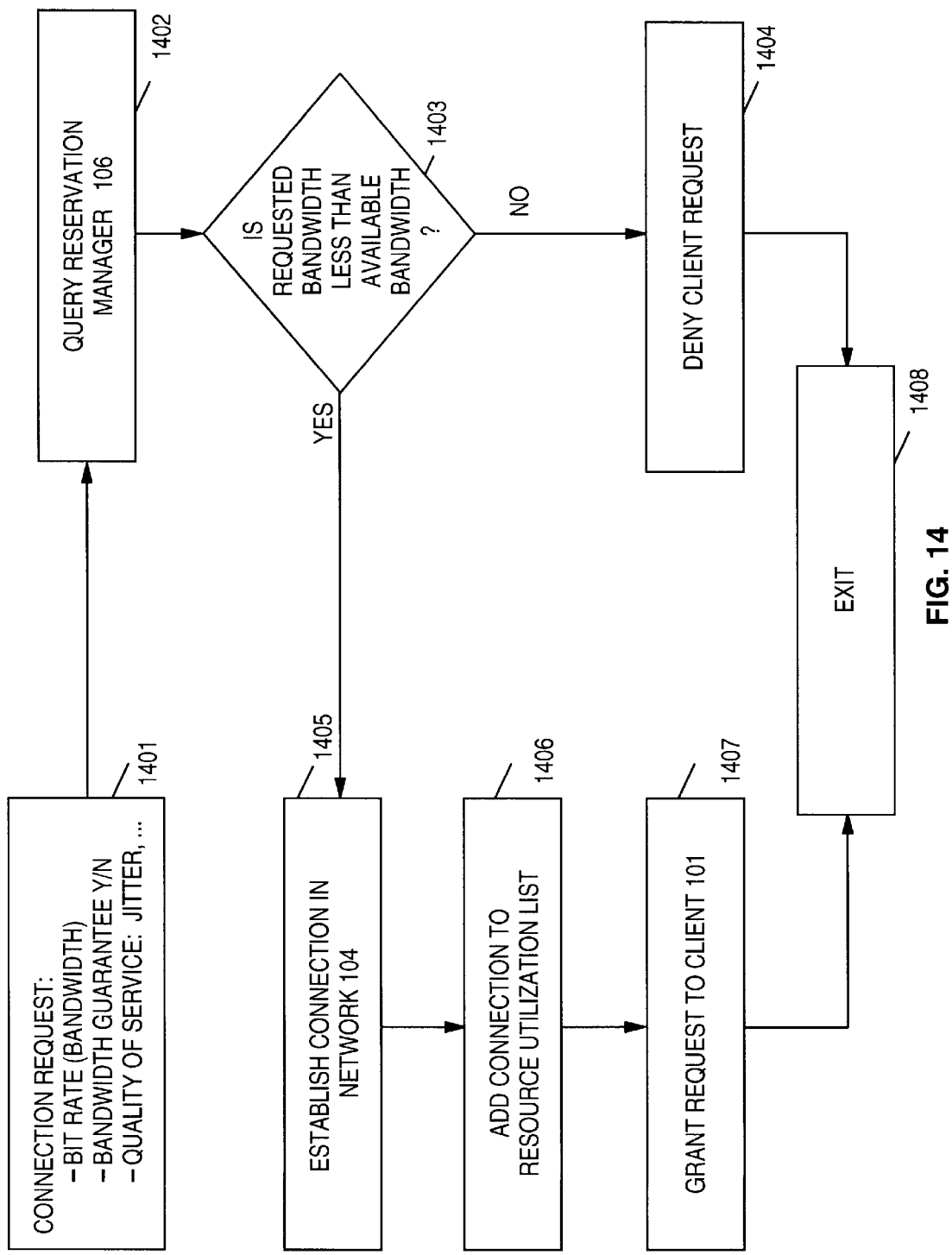
FIG. 14 illustrates a flow diagram of the operation of the connection agent illustrated in FIG. 1.

Referring to FIG. 14, there is illustrated a flow diagram of the operation of the connection agent 105. In step 1401, a connection request from the client 101 is received along with the required bandwidth or bit rate. Additionally, the request may also include such other parameters as whether or not a guarantee of the requested bandwidth is needed and the quality of the service on the resulting connection between the client 101 and the application server 102 with such parameters such as jitter, etc.

Figure 15:
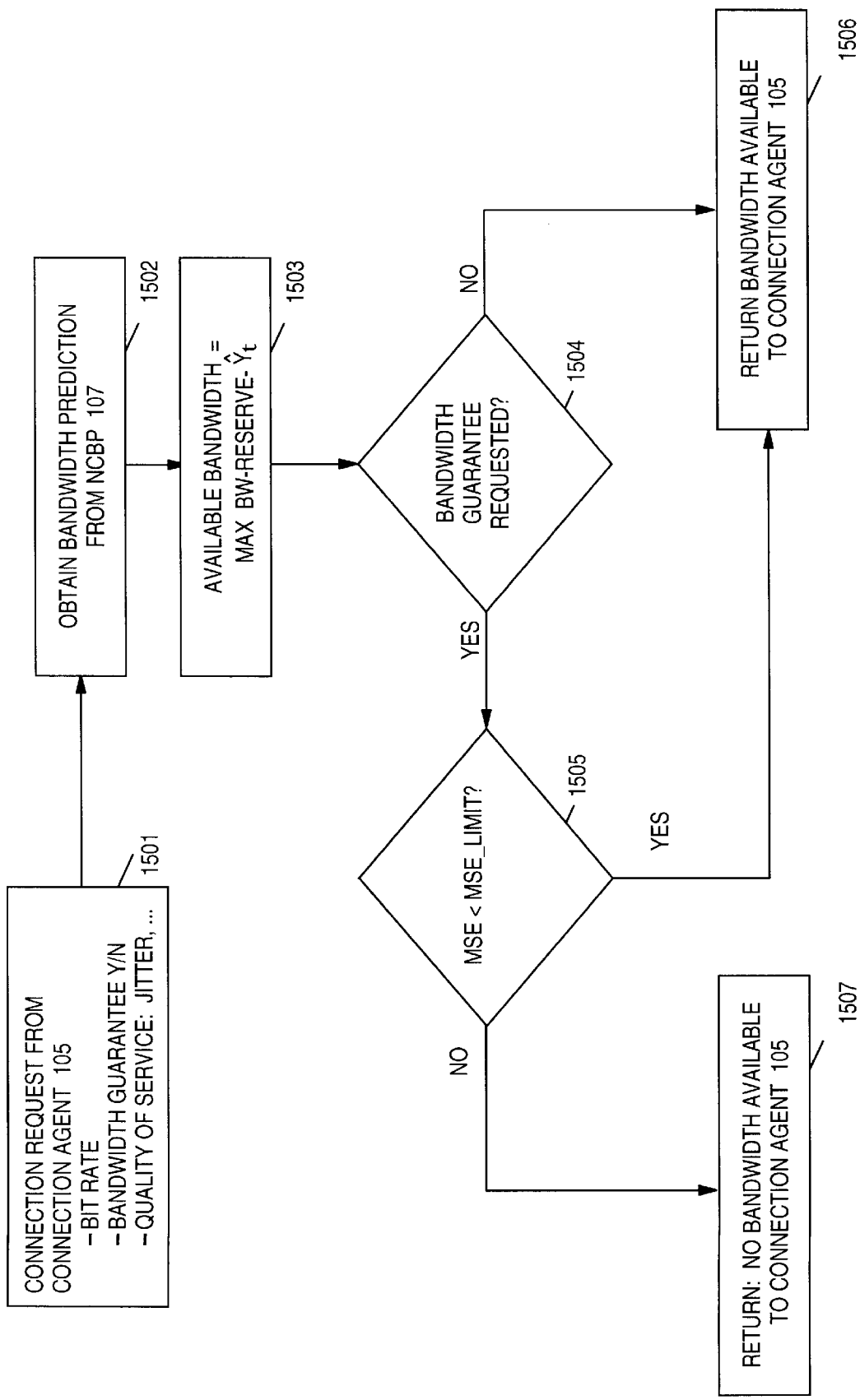
FIG. 15 illustrates a flow diagram of the operation of the reservation manager illustrated in FIG. 1.

In step 1402, the connection agent 105 queries the reservation manager 106. FIG. 15, which is further described below, illustrates in further detail the operation of the reservation manager 106.

In step 1403, if the requested bandwidth is determined to be less than the available bandwidth as predicted by the NCBP 107, then in step 1405, the reservation manager 106 provides a return message indicating that the bandwidth is available and the connection is to be established in the network 104. In step 1406, this connection is added to the resource utilization list. The resource utilization list contains parameters associated with each connection on the link or network segment. These parameters include: the bit rate (bandwidth) of the connection, whether the connection requires a bandwidth guarantee and time of request. The total bandwidth allocated and listed in the resource utilization list is also maintained in a separate variable. Thereafter, in step 1407, the request for the connection between the client 101 and the application server 102 is granted to the client 101. The process ends at step 1408.

If in step 1403 it has been determined that the requested bandwidth is not less than the available predicted bandwidth, then the process proceeds to step 1404 to deny the client request.

Referring next to FIG. 15, there is illustrated a flow diagram of the operation of the reservation manager 106. In step 1501, a request for a connection is received by the reservation manager 106 from the connection agent 105. Thereafter, in step 1502, the reservation manager 106 issues a request for a prediction of the available bandwidth at time t ($\hat{y}_t$). The bandwidth prediction is then received from the NCBP 107. Thereafter, in step 1503, the available bandwidth is computer by subtracting the predicted bandwidth $\hat{y}_t$ from the maximum available bandwidth (Max BW) and a predetermined reserve margin.

Thereafter, in step 1504, if the connection request has required a guarantee on the bandwidth, then the process proceeds to step 1505 to check the mean square error ("MSE") of the prediction against a predetermined limit (MSE_limit). If the MSE is less than the MSE_limit, then a signal indicating that the bandwidth prediction is available is returned to the connection agent 105 in step 1506. Otherwise, a "no bandwidth available" indicator is returned to the connection agent 105 in step 1507.

In step 1504, if not bandwidth guarantee had been requested, then the process proceeds directly to step 1506 to return a signal to the connection agent 105 that the bandwidth is available for the connection.

The system 100 could be constructed so that the connection agent 105 could periodically check for the required bandwidth, and when it becomes available, could notify the client 101. If the client 101 is still interested in the application at that time, the connection could be made.

Figure 16:
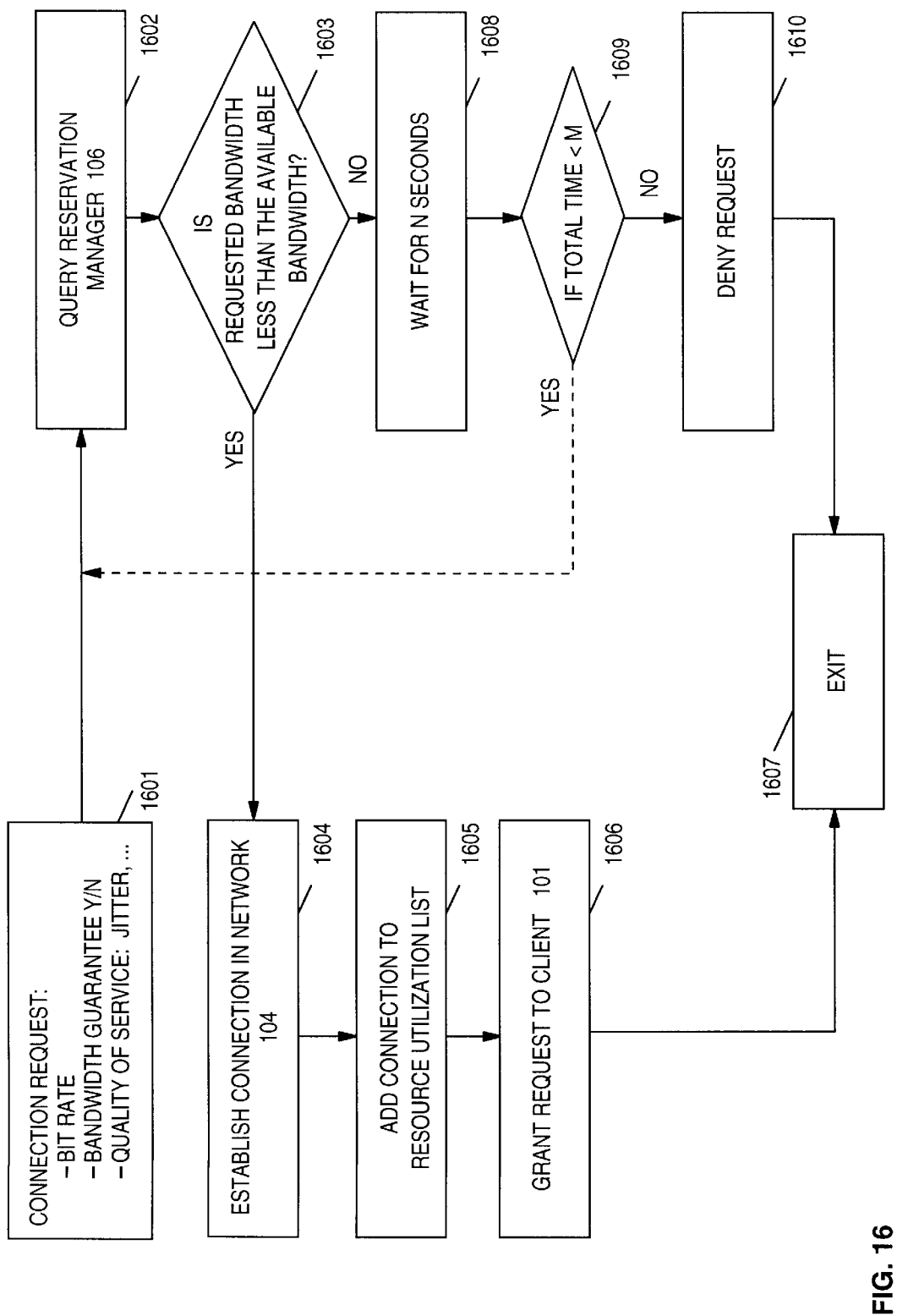
FIG. 16 illustrates a flow diagram of an alternative operation of the connection agent.

Referring next to FIG. 16, there is illustrated a flow diagram of this alternative embodiment. In step 1601, a request for bandwidth is received from the client 101 by the connection agent 105. In step 1602, this request is sent to the reservation manager 106. As described above with respect to FIG. 15, the reservation manager 106 will obtain a bandwidth prediction from the NCBP 107 and provide an indication to the connection agent 105 of whether or not the connection will be granted.

In step 1603, if the reservation manager 106 provides a return message indicating that the requested bandwidth is available, since the requested bandwidth is less than the available bandwidth, then the connection will be established (step 1604) and the request by the client 101 will be granted in step 1606. Steps 1605 and 1607 are similar to steps 1406 and 1408 described above with respect to FIG. 14.

If in step 1603, the return message from the reservation manager 106 indicates that there is insufficient bandwidth, then the connection agent 105 will wait for N seconds in step 1608. If the total wait time exceeds a predetermined configured wait time of M seconds, then the request will be denied in step 1610 and the process will exit at 1607. Otherwise, from step 1609, the process will return to step 1602 to request the same bandwidth again until the request is granted. Please note that the dotted path from step 1609 to step 1602 indicates that this may be an optional path within the process.

Figure 17:
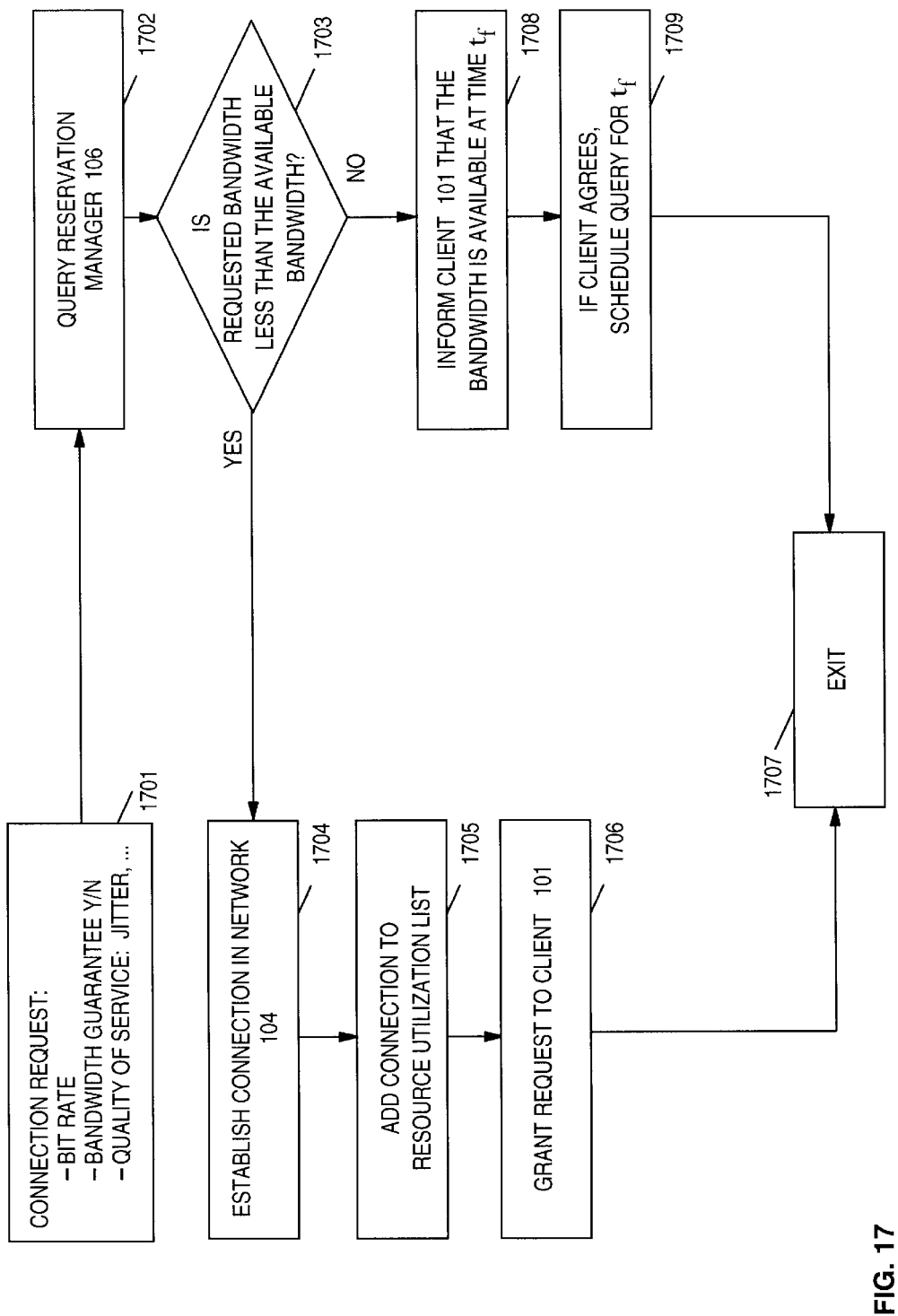
FIG. 17 illustrates an alternative embodiment of the operation of the connection agent.

Also, since the ARIMA model has the inherent ability to incorporate seasonal or periodic information into its predictions, the connection agent 105 could predict when the requested bandwidth would be available. The client 105 could be asked whether or not to reserve the bandwidth at the suggested time. This process is further illustrated by the flow diagram in FIG. 17.

In step 1701, a request for bandwidth is received from a client 101 by the connection agent 105. In step 1702, this request is transferred to the reservation manager 106, which obtains a bandwidth prediction from the NCBP 107 as illustrated above with respect to FIG. 15.

If in step 1703, the reservation manager 106 provides a return message indicating that the bandwidth is available, then the connection is established in step 1074, the bandwidth utilization is recorded in step 1705, and the client 101 is granted the request in step 1706, whereafter the process ends at step 1707.

If, however, in step 1703, the return message from the reservation manager 106 indicates that there is insufficient bandwidth available, then the connection agent 105 informs the client 101 that the bandwidth is available at time $t_f$ in step 1708. If in step 1709, the client 101 agrees and accepts this future reservation request, then the connection agent 105 schedules a new connection request at the future time $t_f$. At time $t_f$, the connection agent 105 will reconsider the request as if it is a new request (to ensure that there is actually sufficient bandwidth available at that particular time).

The reservation manager 106 could be extended to consider the length of time the requested bandwidth would be used. The ARIMA predictor could be used to "look ahead" to make sure that the requested bandwidth would be available for the entire period that it is needed. If a block of bandwidth is not available for the entire time it is needed, the model could be used to schedule the application at an appropriate time.

Figure 18:
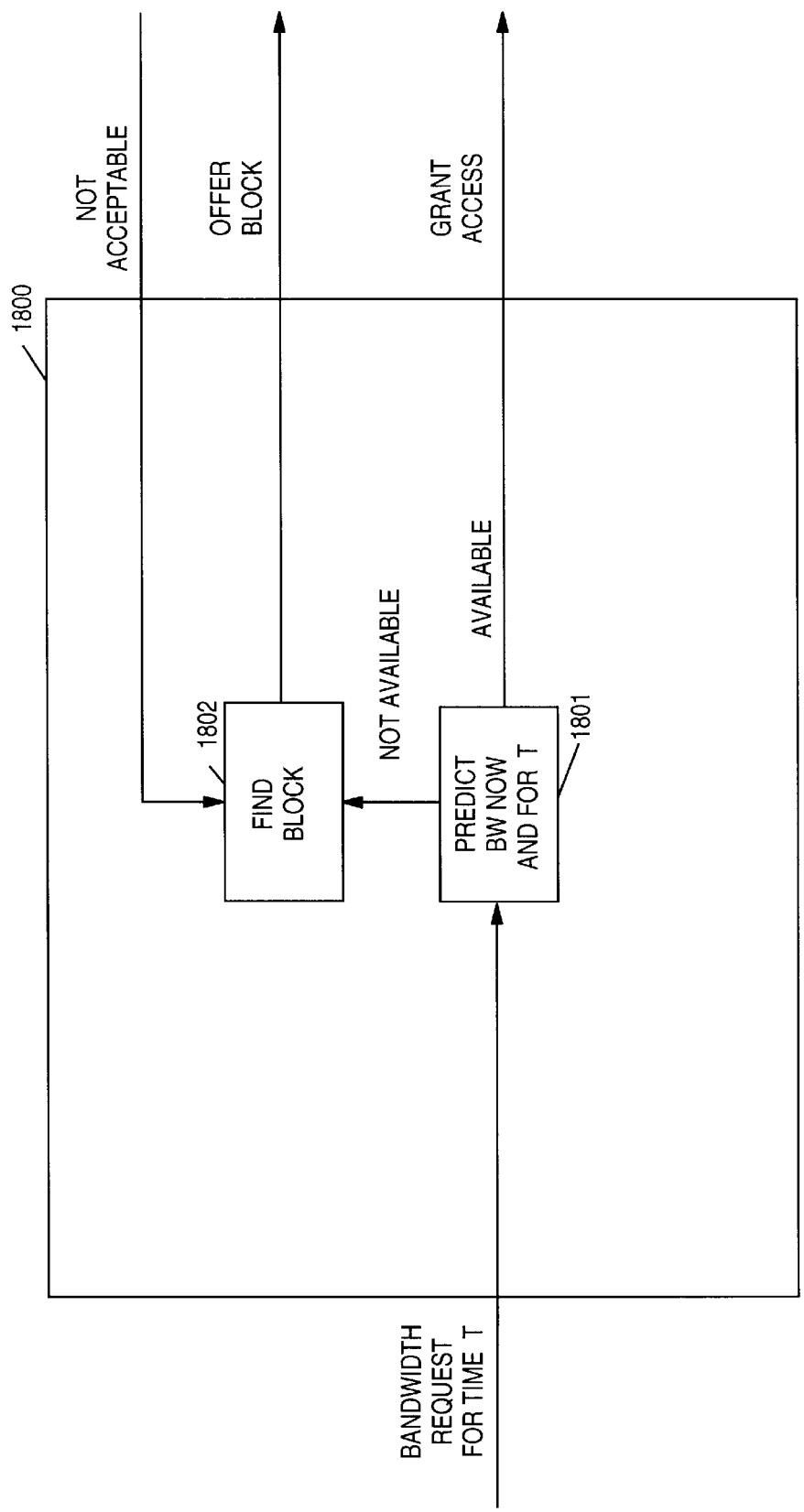
FIG. 18 illustrates an alternative embodiment of a scheduler.

Referring next to FIG. 18, there is illustrated an alternative scheduler 1800. A request for a certain amount of bandwidth for a specified period of time T is received from the client 101. In block 1801, the ARIMA calculator predicts the amount of bandwidth available immediately, and calculates the available bandwidth, at the sample rate, for the duration of the bandwidth request. If the bandwidth is available at the present time, access to the network 104 is allowed. If the bandwidth is not available, the ARIMA calculator searches forward in time to find a block 1802 of time in which the bandwidth would be available. This time period block is offered to the client 101. If the block is accepted, the bandwidth is scheduled for use by the client 101. If the block is not accepted, alternate blocks of time are proposed until the client 101 accepts one. The time and bandwidth are then reserved for the client 101.

Figure 4:
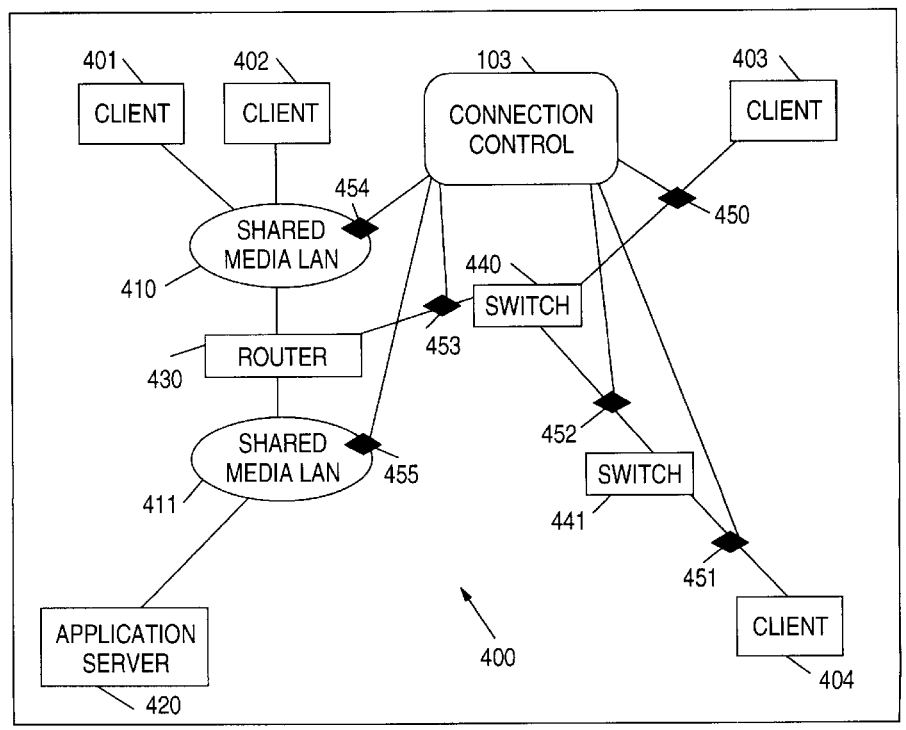
FIG. 4 illustrates a system for bandwidth reservation in accordance with the present invention.
Figure 5:
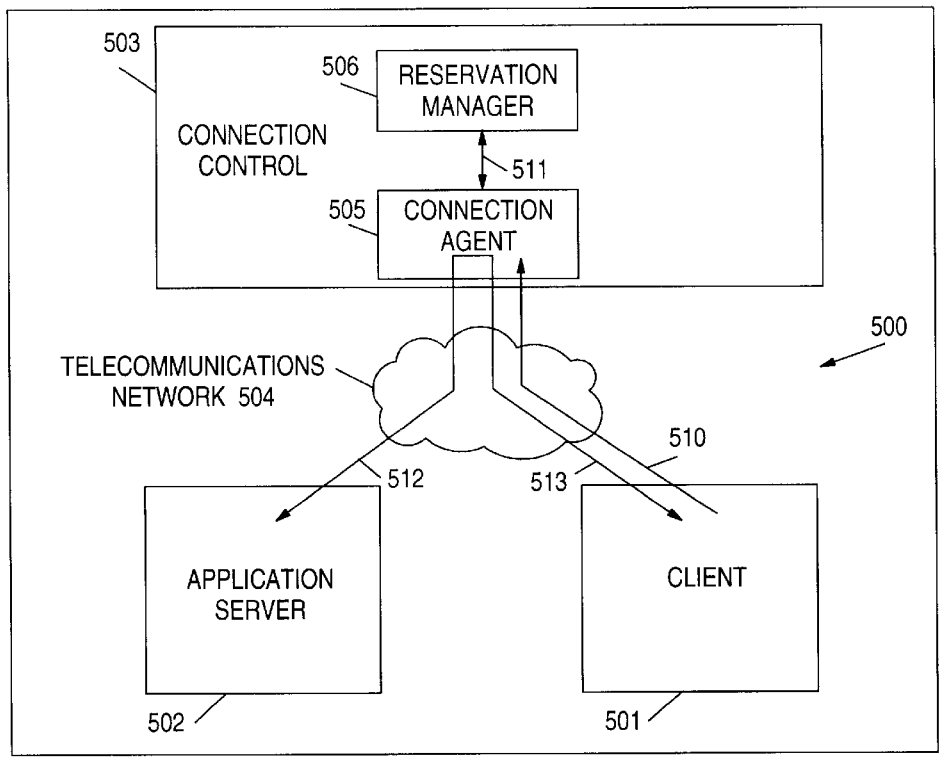
FIG. 5 illustrates a prior art bandwidth management system.
Figure 6:
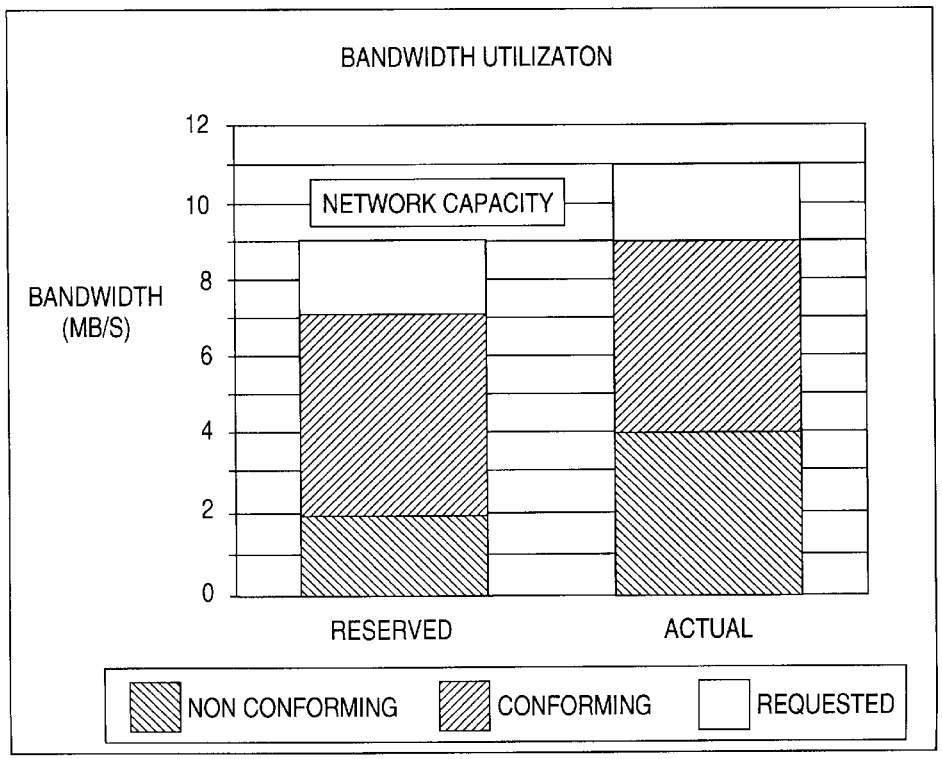
FIG. 6 illustrates a graph of one example of a problem incurred within a prior art bandwidth management system.
Figure 19:
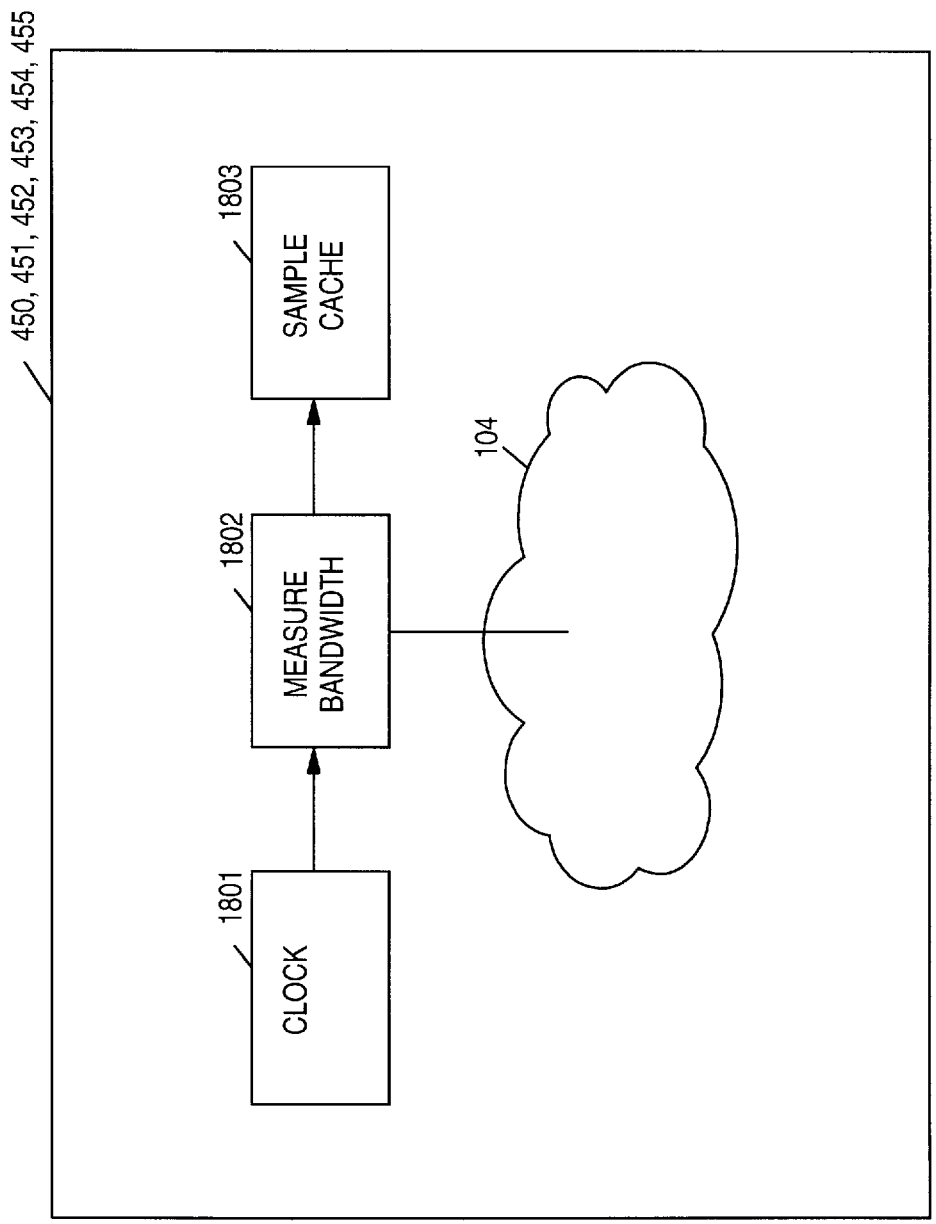
FIG. 19 illustrates, in block diagram form, further detail of the network monitors illustrated in FIG. 4.

The ARIMA model described above can be implemented on a variety of systems. A general system for the implementation of this method consists of clients and servers that are connected through both point-to-point and shared network segments. Such a network 400 is illustrated in FIG. 4. The method as described predicts the available bandwidth for a single segment of a network. In a multi-segment network 400, measurements are taken from each segment separately. These measurements are obtained through network monitors 450–455. The network monitors 450–455 are further illustrated in FIG. 19. Traffic on a network 104 or network segment is measured by a sniffer 1802, which are well known in the art. Samples are taken at times specified by the sample clock 1801. The samples are stored in the sample cache 1803 to be used by the coefficient generators and error calculators described above.

The monitors 450–455 are all coupled to the connection control 103. The exemplary network 400 illustrates the clients 401–404 and the application server 420 interconnected through various means, such as the shared media LANs 410 and 411, a router 430 and the switching devices 440 and 441. The monitors 450–455 are all connected to the connection control 103.

The monitors 450–455 provide the actual $y_t$ measurements at given time periods. Depending on the need for distributed information, the monitors 450–455 can also implement the NCBP 107 and the SMGU 108 at each monitoring location. Therefore, depending on the implementation, either the actual measurements, or the ARIMA coefficients are transferred over to the connection control 103. The connection control 103 will determine the best route for a connection by examining the predicted bandwidth on each link and applying a routing algorithm such as a minimum spanning tree to find the most efficient route.

As presented thus far, the ARIMA predictor is fed samples of the bandwidth used by a network at various points in time. These samples are used to forecast the bandwidth that will be used at times in the future. The bandwidth available for additional reservation can then be calculated.

It would be possible to enhance the accuracy of the prediction by performing two independent predictions, one based on conforming traffic and one based on nonconforming traffic. This implies that a network monitor can distinguish between the two. This can be accomplished if the conforming traffic uses one of the emerging standards for Quality of Service (QoS), such as Resource reSerVation Protocol (RSVP) for TCP/IP traffic or IBM's Networking BroadBand Services (NBBS) for ATM traffic.

For the conforming traffic, the actual bandwidth usage could be compared with the total requested by the reservation system. The ARIMA prediction for conforming traffic could be modified appropriately. For example, if it is determined that typically 10% more bandwidth is reserved at any given time than is actually used, the prediction from the conforming ARIMA model could be reduced accordingly. Obviously, this factor could be changed as needed as the comparison fluctuates or in response to seasonal variations.

In a similar manner, the nonconforming traffic could be monitored with statistics kept by user, connection type, application, or any number of factors. Trends that are identified could be used to modify the output of the nonconforming ARIMA prediction. For example, it may be observed that a particular user's bandwidth requirements go up in time after his connection to a particular multimedia server. This information could be used to pad the bandwidth prediction from the non-conforming model.

Obviously, each prediction model could be further subdivided. For the conforming traffic, a prediction could be made for each protocol participating in bandwidth reservation. Similarly, for nonconforming traffic, a prediction could be made by user, application, server, etc. It's not clear that increasing the granularity of the predictions past a certain point increases the accuracy of the total prediction effort. Each network and user population would have to be considered individually.

Figure 7:
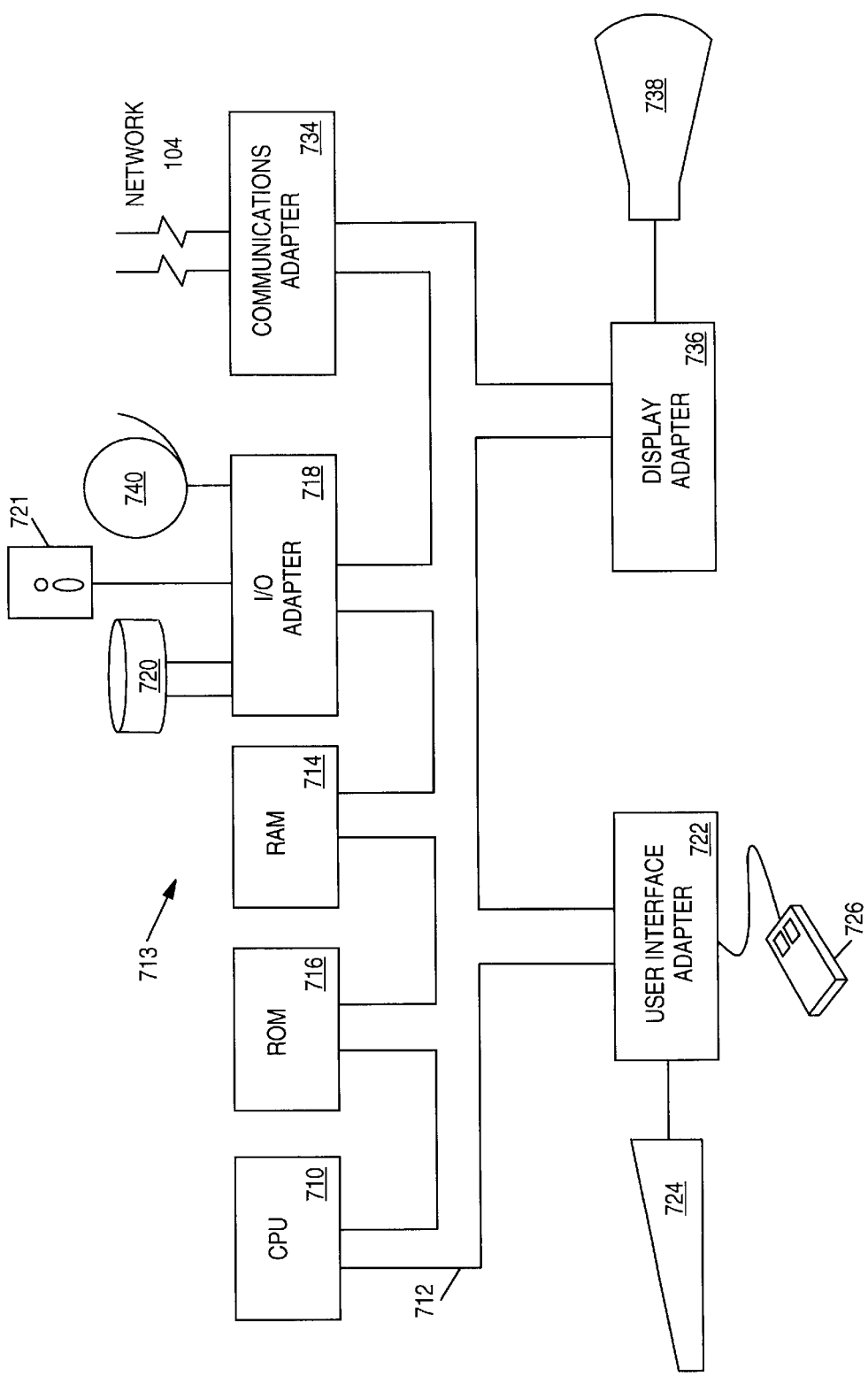
FIG. 7 illustrates a data processing system configurable for use within the present invention.

A representative hardware environment for practicing the present invention is depicted in FIG. 7, which illustrates a typical hardware configuration of workstation 713 in accordance with the subject invention. Workstation 713 may be utilized for any of the various portions of the present invention, including the client computer systems, the application server systems, and the connection control system. Workstation 713 has central processing unit (CPU) 710, such as a conventional microprocessor, and a number of other units interconnected via system bus 712. Workstation 713 includes random access memory (RAM) 714, read only memory (ROM) 716, and input/output (1/0) adapter 718 for connecting peripheral devices such as disk units 720, tape drives 740, and floppy disks 721 to bus 712, user interface adapter 722 for connecting keyboard 724 and mouse 726, and/or other user interface devices such as a touch screen device (not shown) to bus 712, communication adapter 734 for connecting workstation 713 to data processing network 104, and display adapter 736 for connecting bus 712 to display device 738. CPU 710 may reside on a single integrated circuit. The present invention within connection control 103 may be stored within any of the storage devices in workstation 713.

The proposed system offers several advantages over current reservation bandwidth management systems. In systems with non-conforming users, it explains or predicts the behavior of this aspect of the system. In order to reduce the calculations required to statistically compute the nonconforming traffic, the proposed solution uses an off-line model generator which provides the real time predictor with a best fit statistical model. And, since the algorithm is based on a seasonal ARIMA model, the statistical quality of the predictions will be enhanced by removing the seasonal factor from the trend, and the ability to respond to dynamic movements in the trend are better handled by the combination of autoregressive and smoothed moving average variables in the model.

The proposed system is applicable to switched networks such as those based on ATM (asynchronous transfer mode), Frame-Relay or switched-Ethernet, to shared media networks such as Ethernet or Token-Ring and mixed networks that contain both point-to-point (switched) and shared segments.

Although the present invention and its advantages have been described in detail, it should be understood that various changes, substitutions and alterations can be made herein without departing from the spirit and scope of the invention as defined by the appended claims.

What is claimed is:

1. A system operable for allocating network resources to a first computer system requesting a communications path to a second computer system, the system comprising:

a connection agent operable for receiving a request from the first computer system for the communications path to the second computer system; and a bandwidth predictor operable for computing a prediction if the network resources will have enough bandwidth capacity for establishing the communications path, wherein the connection agent grants or denies the request as a function of the prediction, wherein the communications path has an amount of bandwidth, and wherein the request will be granted by the connection agent when the bandwidth capacity is greater than or equal to the amount of bandwidth and wherein, the communications path is to be part of non-conforming traffic within the network resources, and wherein the bandwidth capacity is a predicted maximum amount of bandwidth available in the network resources for the non-conforming traffic.

2. The system as recited in claim 1, wherein the network resources comprise a LAN or WAN.

3. A system operable for allocating network resources to a first computer system requesting a communications path to a second computer system, the system comprising:

a connection agent operable for receiving a request from the first computer system for the communications path to the second computer system; and a bandwidth predictor operable for computing a prediction if the network resources will have enough bandwidth capacity for establishing the communications path, wherein the connection agent grants or denies the request as a function of the prediction, wherein the bandwidth predictor uses an autoregressive integrated moving averages trend analysis to compute the prediction.

4. The system as recited in claim 3, further comprising:

a static model generation utility coupled to the bandwidth predictor operable for analyzing bandwidth utilization over one or more periods of time and for generating coefficients as a result of the bandwidth utilization analyzing to be input into the autoregressive integrated moving averages trend analysis.

5. The system as recited in claim 3, wherein the autoregressive integrated moving averages trend analysis includes:

a mean;

a linear combination of autoregressive terms; and a linear combination of moving averages terms.

6. The system as recited in claim 4, wherein the static model generation utility includes a coefficient generator subcomponent operable for generating the coefficients as a function of actual bandwidth utilization at any given time and a history of past predictions made by the bandwidth predictor.

7. The system as recited in claim 6, wherein the static model generation utility further includes:

an error analysis subcomponent operable for comparing past predictions of the bandwidth predictor with the actual bandwidth;

a model shaping subcomponent, coupled to the error analysis subcomponent and the coefficient generator subcomponent, operable for setting a number of coefficients used by the coefficient generator subcomponent; and a coefficient modifier subcomponent, coupled to the coefficient generator subcomponent and the error analysis subcomponent, operable for dampening the coefficients produced by the coefficient generator subcomponent.

8. A method for allocating network resources to a first computer system requesting a communications path to a second computer system, the method comprising the steps of:

receiving a request from the first computer system for the communications path to the second computer system;

computing a prediction if the network resources will have enough bandwidth capacity for establishing the communications path; and granting or denying the request as a function of the prediction, wherein the network resources carry conforming and non-conforming traffic, and wherein the communications path is to be part of the non-conforming traffic within the network resources, and wherein the bandwidth capacity is a predicted maximum amount of bandwidth available in the network resources for the non-conforming traffic, and wherein the communications path has an amount of bandwidth, and wherein the request will be granted by the connection agent when the bandwidth capacity is greater than or equal to the amount of bandwidth.

9. The method as recited in claim 8, wherein the network resources comprise either a LAN or WAN.

10. The method as recited in claim 8, wherein the computing step uses an autoregressive integrated moving averages trend analysis to compute the prediction.

11. The method as recited in claim 8, further comprising the step of repeating the step of computing the prediction after a period of time if there is not enough bandwidth capacity for establishing the communications path.

12. A method for allocating network resources to a first computer system requesting a communications path to a second computer system, the method comprising the steps of;

receiving a request from the first computer system for the communications path to the second computer system:

computing a prediction if the network resources will have enough bandwidth capacity for establishing the communications path;

granting or denying the request as a function of the prediction;

if the computing step predicts that there will not be enough bandwidth capacity for establishing the communications path, computing a prediction if the network resources will have enough bandwidth capacity for establishing the communications path at a future time t; and granting the request if the prediction of network resources at the future time t indicates that there will be enough bandwidth capacity for establishing the communications path at the future time t.

13. A computer readable storage medium containing program code operable for allocating network resources to a first computer system requesting a communications path to a second computer system, the program code comprising:

first program means operable for receiving a request from the first computer system for the communications path to the second computer system;

a second program means operable for computer a prediction if the network resources will have enough bandwidth capacity for establishing the communications path, wherein the connection agent grants or denies the request as a function of the prediction, wherein the communications path has an amount of bandwidth, and wherein the request will be granted by the connection agent when the bandwidth capacity is greater than or equal to the amount of bandwidth, wherein the communications path is to be part of non-conforming traffic within the network resources, and wherein the bandwidth capacity is a predicted maximum amount of bandwidth available in the network resources for the non-conforming traffic.

14. A computer readable storage medium containing program code operable for allocating network resources to a first computer system requesting a communications path to a second computer system, the program code comprising:

first program means operable for receiving a request from the first computer system for the communications path to the second computer system;

a second program means operable for computer a prediction if the network resources will have enough bandwidth capacity for establishing the communications path, wherein the connection agent grants or denies the request as a function of the prediction, wherein the bandwidth predictor uses an autoregressive integrated moving averages trend analysis to computer the prediction.

15. The storage medium as recited in claim 14, further comprising:

a third programming means operable for analyzing bandwidth utilization over one or more periods of time and for generating coefficients as a result of the bandwidth utilization analyzing to be input into the autoregressive integrated moving averages trend analysis.

16. The storage medium as recited in claim 14, wherein the autoregressive integrated moving averages trend analysis includes:

a mean;

a linear combination of autoregressive terms; and a linear combination of moving averages terms.

17. The storage medium as recited in claim 16, wherein the third programming means includes a coefficient generator subcomponent operable for generating the coefficients as a function of actual bandwidth utilization at any given time and a history of past predictions made by the bandwidth predictor.

18. The storage medium as recited in claim 17, wherein the third programming means further includes:

a fourth programming means analysis subcomponent operable for comparing past predictions of the second programming means with the actual bandwidth;

a fifth programming means operable for setting a number of coefficients used by the coefficient generator subcomponent, operable for setting a number of coefficients used by the coefficient generator subcomponent; and a coefficient modifier subcomponent, coupled to the coefficient generator subcomponent and the error analysis subcomponent, operable for dampening the coefficients produced by the coefficient generator subcomponent.

19. A data processing network comprising a plurality of client computer systems coupled together to one or more application server systems, wherein the data processing network further comprises a connection control system for allocating network resources to a first client computer system requesting a communications path to an applications server, the connection control system comprising:

a connection agent for receiving a request from the first client computer system for the communications path to the application server;

a bandwidth predictor operable or computing a prediction if the network resources will have enough bandwidth capacity for establishing the communications path, wherein the connection agent grants or denies the request as a function of the prediction, wherein the bandwidth predictor uses an autoregressive integrated moving averages trend analyses to compute the prediction; and a static model generation utility coupled to the bandwidth predictor for analyzing bandwidth utilization over one or more periods of time and for generating coefficients as a result of the bandwidth utilization analyzing to be input into the autoregressive integrated moving averages trend analyses, wherein the communications path has an amount of bandwidth, and wherein the request will be granted by the connection agent when the bandwidth capacity is greater than or equal to the amount of bandwidth.

* * * * *